June 8, 1926.
F. C. MOORE
RIM LUG NUT LOCK
Filed Jan. 26, 1926
1,587,976
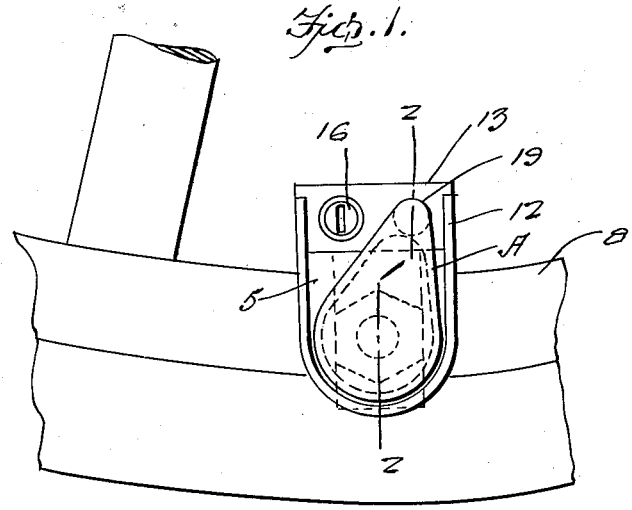
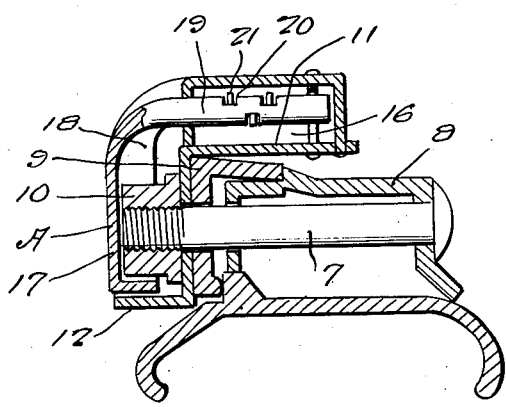
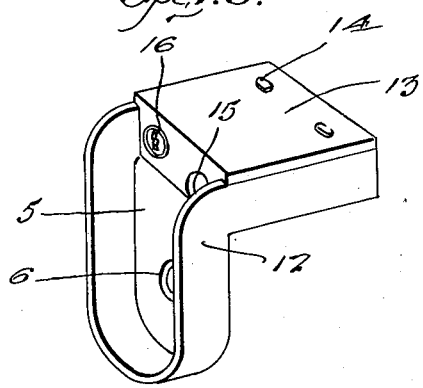
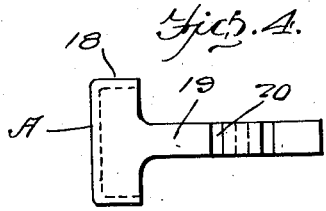
Inventor
F. C. Moore
By Clarence A. O'Brien
Attorney Patented June 8, 1926.

1,587,976

UNITED STATES PATENT OFFICE.

FRANK C. MOORE, OF NEW ORLEANS, LOUISIANA.

RIM LUG NUT LOCK.

Application filed January 26, 1926. Serial No. 83,896.

The present invention relates to a device for preventing the theft of automobile tires off of the wheels. This type of theft is becoming more common as devices to prevent theft of tires from spare racks are becoming more perfected.

The device serves to lock one nut holding the rim on thereby preventing the rim from being removed from the wheel. The device is preferably placed on a lug nut on the opposite side of the rim from the valve. When placed in this position, it will prevent the removal of the tire rim entirely by persons not having a key to the lock.

The device provides a structure which completely covers the lug nut so that it is impossible for unauthorized persons to obtain access thereto.

I aim to provide a rim lug nut lock of this class which is exceedingly simple in its construction, efficient, reliable, strong, durable, easy to manipulate, and compact, convenient, easy to assemble or disassemble, and otherwise well adapted to the purpose for which it is designed.

With the above and numerous other objects in view, the invention resides in certain novel features of construction, and in the combination and arrangement of parts as will be hereinafter more fully described and claimed.

In the drawing:

Figure 1 is a fragmentary view of a wheel assembly showing my improved nut lock associated therewith, Fig. 2 is a section taken substantially on the line 2—2 of Fig. 1, Fig. 3 is a perspective view of the plate and lock housing, and Fig. 4 is an elevation of the nut cover and its shank.

Referring to the drawing in detail, it will be seen that 5 designates a plate having an opening 6 for receiving the bolt 7 which passes through the felly 8 of a wheel and has thereon the usual lug 9. The usual nut 10 holds the lug 9 in place and my improved plate 5 is located between the nut 10 and the lug 9 as is clearly seen in Fig. 2.

The plate 5 is provided with a rectangularly disposed inwardly extending extension 11. A marginal flange 12 is provided with the plate 5 and its extension. A lock housing 13 is fixed on the extension 11 by suitable fastening elements 14 or in any other manner, and has a shank receiving opening 15 and any suitable lock 16. A cover is indicated generally by the letter A. Referring to this cover, in detail, it will be seen that the same includes a plate 17 having a marginal flange 18 so as to be capable of encasing the nut 10 as is indicated to advantage in the drawings.

A shank 19 extends rectangularly from one end of the plate and is adapted to extend into the opening 15, and the notches 20 of the shank 19 may be engaged by suitable bolts 21 operable by the lock 16. When the cover A is disposed over the lug nut 10 and the shank 19 is locked in the housing 13, it will be seen that unauthorized persons may not obtain access to the lug nut and therefore cannot remove the tire rim from the felly of the wheel.

It is thought that the construction, operation, advantages of the invention will now be clearly seen without a more detailed description thereof. Particular attention, however, is directed to the compactness of the structure, which is produced by the details described above and particularly the convenience with which the parts may be assembled and disassembled.

Attention is further directed to the efficiency of the device which may be made strong and durable by the use of suitable material, and is capable of being manufactured at a low cost.

The present embodiment of the invention has been disclosed merely in detail merely by way of example, since in actual practice it attains the features of advantage enumerated as desirable in the statement of the invention and the above description.

It will be apparent, however, that numerous changes in the details of construction, and in the combination and arrangement of the parts may be resorted to without departing from the spirit or scope of the invention as hereinafter claimed, or sacrificing any of its advantages.

Having thus described my invention, what I claim as new is:—

1. A tire rim lock including a plate having an opening to receive a rim bolt and provided with a marginal flange adapted to partially encase the nut of a rim bolt received in said opening, the plate being adapted for disposal between the lug of the bolt and lug nut, a lock housing on the plate, a shank associated with the housing for locking engagement therein, and a cover on the shank for encasing the rim bolt nut to prevent access thereto by unauthorized persons.

2. A tire rim lock including a plate having an opening to receive a rim bolt and provided with a marginal flange adapted to partially encase the nut of a rim bolt received in said opening, the plate being adapted for disposal between the lug of the bolt and lug nut, a lock housing on the plate, a shank associated with the housing for locking engagement therein, a cover on the shank for encasing the rim bolt nut to prevent access thereto by authorized persons, said cover being in the form of a plate having a marginal flange receivable within the confines of a flange marginally formed on the first mentioned plate.

In testimony whereof I affix my signature.

FRANK C. MOORE.